(12) United States Patent
Zhu et al.

(10) Patent No.: US 7,964,023 B2
(45) Date of Patent: Jun. 21, 2011

(54) REGENERATIVE SULFUR SORPTION

(75) Inventors: Tianli Zhu, Cheshire, CT (US);
Christian Junaedi, Cheshire, CT (US);
Subir Roychoudhury, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 221 days.

(21) Appl. No.: 12/290,609

(22) Filed: Oct. 30, 2008

(65) Prior Publication Data
US 2009/0139402 A1 Jun. 4, 2009

Related U.S. Application Data

(60) Provisional application No. 61/001,148, filed on Oct. 31, 2007.

(51) Int. Cl.
*B01D 53/04* (2006.01)
(52) U.S. Cl. ............... 95/135; 95/136; 423/230
(58) Field of Classification Search .......... 95/135, 95/136, 148; 96/154; 423/220, 230, 244.01, 423/622
See application file for complete search history.

(56) References Cited

U.S. PATENT DOCUMENTS

| | | | | |
|---|---|---|---|---|
| 3,713,281 | A * | 1/1973 | Asker et al. ............... | 96/154 |
| 4,981,501 | A * | 1/1991 | Von Blucher et al. ......... | 96/153 |
| 5,308,457 | A * | 5/1994 | Dalla Betta et al. .......... | 95/143 |
| 5,501,007 | A * | 3/1996 | Kuma ..................... | 29/846 |
| 5,827,355 | A * | 10/1998 | Wilson et al. .............. | 95/114 |
| 6,197,097 | B1 * | 3/2001 | Ertl et al. ................. | 96/143 |
| 6,328,936 | B1 | 12/2001 | Roychoudhury et al. ..... | 422/174 |
| 6,746,657 | B2 | 6/2004 | Castaldi .................. | 423/437.2 |
| 6,905,534 | B2 * | 6/2005 | Chang et al. .............. | 96/55 |
| 7,141,092 | B1 | 11/2006 | Roychoudhury et al. ....... | 95/90 |
| 7,504,047 | B2 * | 3/2009 | Castaldi et al. ............ | 252/373 |
| 7,531,029 | B2 * | 5/2009 | Hoke et al. ............... | 96/134 |
| 2002/0041842 | A1 * | 4/2002 | Ruettinger et al. .......... | 423/230 |
| 2002/0178915 | A1 * | 12/2002 | Shore et al. .............. | 95/136 |
| 2006/0272508 | A1 * | 12/2006 | Hoke et al. ............... | 96/134 |

OTHER PUBLICATIONS

Roychoudhury et al, "Microlith Based Sorber for Removal of Environmental Contaminants," (2004), SAE International.*
B.K. Chang, Y. Lu, H. Yang, and B. J. Tatarchuk, Journal of Materials Engineering and Performance, vol. 15, "Facile Regeneration Vitreous Microfibrous Entrapped Supported ZnO Sorbent with High Contacting Effciency for Bulk H2S Removal from Reformate Streams in Fuel Cell Applications"(2006).
B.K. Chang, Y. Lu, H. Yang, and B. J. Tatarchuk, Journal of Materials Engineering and Performance, vol. 15, "Glass fiber entrapped sorbent for reformates desulfurization for logistic PEM fuel cell power systems" (2006).
G. Alptekin, S. DeVoss, M. Dubovik, J. Monroe, R. Amalfitano, and G. Israelson, Journal of Materials Engineering and Performance, vol. 15, "Regenerable Soorbent for Natural Gas Desulfurization" (2006).
I. I. Novochinskii, C. Song, X. Ma, X. Liu, L. Shore, J. Lampert, and R. J. Farrauto, Energy and Fuels, vol. 18, "Low-Temperature H2S Removal from Steam-Containing Gas Mixtures with ZnO Particles and Extrudates" Applications 1 and 2 (2004).
R. B. Slimane and B. E. Williams, Industrial and Engineering Chemistry Research, vol. 41, "New ZnO-Based Regenerable Sulfur Sorbents for Fluid-Bed/Transport Reactor Applications" (2002).
M. Flytzani-Stephanopoulos, M. Sakbodin, and Z. Wang, Science, vol. 312, Regenerative Adsorption and Removal of H2S from Hot Fuel Gas Streams by Rare Earth Oxides (2006).

* cited by examiner

*Primary Examiner* — Frank M Lawrence
(74) *Attorney, Agent, or Firm* — Robert L. Rispoli

(57) ABSTRACT

A substrate or method for the sorption of sulfur compounds with a high capacity includes providing a substrate that defines at least one layer of ultra-short-channel-length mesh, coating at least a portion of the substrate with a desired sorbent for sulfur sorption, and passing a flowstream through the substrate and in contact with the sorbent during sorption.

20 Claims, 2 Drawing Sheets

H₂S exit concentration as a function of time obtained from two H₂S sorption tests.

H$_2$S and SO$_2$ concentrations as a function of time obtained from the sulfidation/regeneration test.

REGENERATIVE SULFUR SORPTION

CROSS-REFERENCE TO RELATED APPLICATION

This application claims the benefit of U.S. Provisional Application No. 61/001,148 filed on Oct. 31, 2007.

GOVERNMENT RIGHTS

This invention was made with government support under U.S. Army Contract No. W15P7T-07-C-P431. The U.S. government holds certain rights in this invention.

BACKGROUND OF THE INVENTION

1. Field of the Invention

The present invention is generally directed to a substrate or method for a more efficient removal of sulfur compounds from the outlet of a fuel processor. In particular, this invention provides an improved sorption capacity which enables the sulfur clean-up unit to operate for a longer duration. Additionally, this invention provides for a regenerable, energy efficient, and lightweight sorption system for the removal of sulfur in fuel cell applications.

2. Description of the Related Art

Absorption, in chemistry, is a physical or chemical phenomenon; a process in which atoms, molecules, or ions enter some bulk phase—gas, liquid or solid material. Absorption is the taking of molecules of one substance directly into another substance. Absorption may be either a physical or a chemical process; physical absorption involving such factors as solubility and vapor-pressure relationships, and chemical absorption involving chemical reactions between the absorbed substance and the absorbing medium. In sum, the process of absorption comprises the molecules of one material being taken up by the volume, not by surface, of another material.

Adsorption is a different process from absorption since, with adsorption, the molecules of a first substance adhere only to the surface of the second substance. Adsorption is a process that occurs when a gas or liquid solute accumulates on the surface of a solid or a liquid (adsorbent), forming a film of molecules or atoms (the adsorbate). It is different from absorption in which a substance diffuses into a liquid or solid to form a solution. Adsorption is the gathering of matter only. The matter collects on the surface of the adsorbing material; it does not enter the interior.

As is known to those skilled in the art, and as set forth above, adsorption is adhesion of the molecules of liquids, gases, and dissolved substances to the surfaces of solids, as opposed to absorption, in which the molecules actually enter the absorbing medium. A more general term used in the art is "sorption" which covers adsorption, absorption, and ion exchange.

As is also known in the prior art, Zeolites are natural or synthetic crystalline aluminosilicates which have a repeating pore network and release water at high temperature. They are manufactured by hydrothermal synthesis of sodium aluminosilicate or another silica source in an autoclave followed by ion exchange with certain cations ($Na^+$, $Li^+$, $Ca_2^+$, $K^+$, $NH_4^+$). The channel diameter of zeolite cages usually ranges from 2 to 9 Å (200 to 900 pm). The ion exchange process is followed by drying of the crystals, which can be pelletized with a binder to form macroporous pellets. Zeolites are applied in the drying of process air, $CO_2$ removal from natural gas, CO removal from reforming gas, air separation, catalytic cracking, and catalytic synthesis and reforming.

Conventional sulfur sorbents are usually based on pellets or extrudates. For example, zinc oxide (ZnO)-based pellet or extrudate is commonly used as $H_2S$ sorbent. The ZnO pellet performance strongly depends on pore and lattice diffusion, and is low at low temperature (<350° C.) due to the high activation energy of the lattice diffusion process. One way to improve the low temperature activity is to adjust the pore structure and the surface area of the pellet. On the other hand, sorbent regeneration requires the pellet/extrude be able to survive frequent sorption/desorption cycles thus requires high crush strength and low dusting. High pore volume and high crush strength are conflicting requirements. Therefore, sorbent designs often have to balance these issues.

In one study performed by B. K. Chang, Y. Lu, H. Yang, and B. J. Tatarchuk, as reported in the *Journal of Materials Engineering and Performance*, volume 15 (2006) (hereinafter referred to as "Chang"), the authors describe the development a system consisting of microsized zinc oxide ($ZnO$)/$SiO_2$ sorbent particulates supported on a microfibrous, glass fiber material and its application for the $H_2S$ removal from the outlet/reformate stream of a fuel processor. The system in their study showed a significant improvement in the ZnO utilization compared to the typical ZnO extrudates bed due to the use of small-sized support particulates, which promotes the high contacting efficiency and high accessibility of the ZnO. Furthermore, their system provided significant improvement in the regenerability aspect compared to the ZnO extrudates bed.

One problem associated with the ZnO sorbent loading in the system described above is the limited loading capacity of only ~1050 mg of ZnO per $in^3$ of bed (calculated based on the information given in Table 1 of Chang). In addition to a high sulfur sorption capacity (weight basis) and high ZnO utilization, both of which were shown in Chang, a high ZnO sorbent loading in an $H_2S$ removal unit is important in order to achieve a high overall volumetric sorption capacity (mg of $H_2S$ uptake per $in^3$ of $H_2S$ removal bed). Additionally, the Chang system implemented an external heating element during the regeneration process which leads to a less energy efficient, heavier sulfur sorption system.

In a study performed by H. Yang, Y. Lu, and B. J. Tatarchuk, as reported in the *Journal of Power Sources*, volume 174 (2007) (hereinafter referred to as "Yang"), the authors further describe the development of glass fiber entrapped $ZnO$/$SiO_2$ sorbent (GFES) to remove sulfur ($H_2S$) from the reformate/outlet stream of a fuel processor with the benefits of a longer breakthrough time, higher ZnO utilization, and improved regenerability compared with the commercial ZnO extrudates. However, as with Chang, this system provides a limited loading of ZnO per $in^3$ of bed; while a high ZnO sorbent loading in an $H_2S$ removal unit is important in order to achieve a high overall volumetric sorption capacity.

In yet another study, G. Alptekin, S. DeVoss, M. Dubovik, J. Monroe, R. Amalfitano, and G. Israelson, *Journal of Materials Engineering and Performance*, volume 15 (2006) (hereinafter referred to as "Alptekin"), the authors describe the development of a sorbent material for natural gas desulfurization. Their test results showed that the sorbent can remove sulfur compounds at ambient temperature with relatively high capacity. The sorbent can also be regenerated by the temperature swing regeneration procedure.

Although the Alptekin sorbent material showed an improvement over other sorbents when operating at ambient temperature (See Alptekin, Table 2), the sulfur sorption capacity of 3.1 wt. % is still very low compared to the commercial ZnO sorbent material (i.e., the sulfur sorption capacity of a ZnO extrudates bed is ~10-15 wt. % when operating at its optimum temperature of 300-400° C.). The authors did not mention the sulfur sorption capacity of the Alptekin sorbent material when operating at 300-400° C. The low sulfur sorption capacity of the sorbent bed will result in a shorter bed lifetime, which is not desirable for practical applications. Furthermore, as with Chang, the system requires an external heater to provide heat during the regeneration process, which results in a longer regeneration time.

In other prior art studies, I. I. Novochinskii, C. Song, X. Ma, X. Liu, L. Shore, J. Lampert, and R. J. Farrauto, as reported in *Energy and Fuels*, volume 18 (2004) (hereinafter, "Novochinskii"), the authors describe the development and testing of a unique, modified ZnO sample with a different morphology than a commercially available ZnO sample in the year of 2003. The papers disclosed the study on ZnO particles and extrudates, and the application and coating of the modified ZnO sample on a monolith. The ZnO bed was used to remove $H_2S$ from the outlet stream of a fuel processor for fuel cell applications. This study also found that the sorbent-coated monolith gave a higher sulfur sorption capacity compared to the extrudates bed of the same sorbent material under the same operating conditions.

One problem associated with Novochinskii is that in the extrudates form, the modified ZnO sorbent had a maximum sulfur sorption capacity of only 2.81 wt. % (i.e., 0.0281 g of S sorbed per gram of ZnO), which is lower than the optimum capacity of current (2007) commercial ZnO pellet bed at similar operating conditions. Upon coating the modified ZnO sorbent on a monolith substrate, the sulfur sorption capacity could be increased to 3.55 wt. % (i.e., 0.0355 g of S sorbed per gram of ZnO). Additionally, the ZnO sorbent loading in the monolith bed was only ~1070 mg of ZnO per $in^3$ of bed (calculated based on the information given in Novochinskii, Table 3), which is much lower than that which may be achieved with the present invention.

In yet another study, R. B. Slimane and B. E. Williams, as reported in the *Industrial and Engineering Chemistry Research*, volume 41, (2002) (hereinafter, "Slimane"), the authors describe a sorbent synthesis technique developed at GTI for the preparation of ZnO-based regenerable sulfur sorbents. The capability to produce sintering at low temperatures resulted in materials with high surface areas, small pore sizes, and very high attrition resistance. However, the sulfur sorption capacity (weight basis) in the powder form is either lower or similar with the capacity obtained using the current (2007), commercially available ZnO pellets. Moreover, this prior art does not describe the bed utilization when testing the sorbent materials in extrudates or pellets form. Sulfur sorption process using the powder form is not practical due to an extremely high pressure drop across the bed. Finally, as with many of the other prior art systems, the Slimane sulfur removal bed requires an external heater to provide heat during the regeneration process, which results in a longer regeneration time.

As described in U.S. Pat. No. 7,141,092 to Roychoudhury, et al. ("the '092 patent") there are several methods known in the prior art for raising the temperature of the process to a required temperature range including heating the flowstream or the sorbent structure by employing an external heat source. However, non-uniform heat distribution within a fixed-bed substrate or other sorbent structure negatively impacts the efficiency of the process. In addition, the time it takes for an external heat source to raise the temperature of the sorbent structure, and thereby raise the temperature of the sorbent and the working fluid, further negatively impacts the efficiency of the process.

As further taught in the '092 patent, $CO_2$ and trace contaminants can be removed within a single-unit employing a sorption bed comprising ultra-short-channel-length metal meshes coated with zeolite sorbents. The adsorption process of the '092 patent was designed for spacecraft cabin air quality control and the removal of environmental contaminants in space flight applications. The '092 patent teaches the use of zeolites for the adsorption of $CO_2$ and trace contaminants.

Accordingly, based on the shortcomings of the prior art, it is an object of the present invention to provide a sulfur removal unit in a fuel processor that has a higher volumetric sorption capacity than the current pellets or extrudates bed system to allow for a longer lifetime at the same unit size. It is also an object of the present invention to provide a regenerable, efficient sulfur removal unit that can be regenerated via a direct, resistive heating method which will enable a faster and logistically desirable periodic regeneration and will lead to a more energy efficient sulfur removal unit.

DESCRIPTION OF THE INVENTION

Conventional sulfur sorbents are usually based on pellets or extrudates. For example, zinc oxide (ZnO)-based pellet or extrudate is commonly used as $H_2S$ sorbent. The ZnO pellet performance strongly depends on pore and lattice diffusion, and is low at low temperature (<350° C.) due to the high activation energy of the lattice diffusion process. One way to improve the low temperature activity is to adjust the pore structure and the surface area of the pellet. On the other hand, sorbent regeneration requires the pellet/extrude be able to survive frequent adsorption/desorption cycles; thus, it requires high crush strength and low dusting. High pore volume and high crush strength are conflicting requirements. Therefore, sorbent design often has to balance these issues.

It has now been discovered that coating an ultra-short channel length mesh with a sulfur-sorbent formulation can produce a significant improvement in volumetric sorption capacity while also enabling lower sorbent loading per $H_2S$ sorbed than is needed with pellets. Due to the high surface area-to-volume ratio of the ultra-short channel length substrate (referred to hereinafter as "Microlith®," a registered trademark owned by Precision Combustion, Inc.), Microlith® supported sorbent can provide very high surface area and pore volume. By developing adequate adhesion of coated material on Microlith® substrate, Microlith® supported sorbent can provide durable performance without compromising surface area and pore volume. This will result in a better sulfur sorption process, especially at low temperature, which will lead to a higher sorbent utilization (which can be as high as close to 100%) than pellets or extrudates. Additionally, due to the nature of a Microlith® coil reactor, if there is any spalling of sorbent, material can be captured in between layers and thus provide additional protection from sorbent loss.

A Microlith® supported sorbent system also provides faster sorbent regeneration due to better heat transfer, which is characteristic of the ultra short channel length substrate. Metal based Microlith® substrates also provide a means for direct electrical heating. These two characteristics, separate or in combination, result in a more energy efficient and lightweight sorption system than the systems known in the prior art.

As discussed above with respect to prior art systems, Professor Tatarchuk's group has shown that Microfibrous Entrapped ZnO provides high capacity and high regenerability due to high contact efficiency and high accessibility of ZnO. This approach involves individual particulate with size of 150-250 micron entrapped in the fiber glass. In contrast, by direct coating the Microlith® substrate with the sorbent materials, the Microlith® supported sorbent approach provides better contact of the gas stream with sorbent. Accordingly, the present invention provides better mass and heat transfer, minimizes diffusion by providing uniform thin coating, and results in higher capacity and faster regeneration. It has higher mass-per-volume loading of sorbent; therefore it exhibits a higher sorbent capacity on unit volume. A Microlith® based sorbent system according to the present invention also provides better control of sorbent loading and higher durability.

The present invention comprises an improvement over the '092 patent described above with reference to the use of zeolites for the removal of $CO_2$ and trace contaminants. The '092 patent is incorporated herein in its entirety. The present invention provides for the removal of $H_2S$, for example for extending fuel cell life by minimizing sulfur poisoning of the fuel cell membrane.

DETAILED DESCRIPTION OF THE INVENTION

Figure 1:
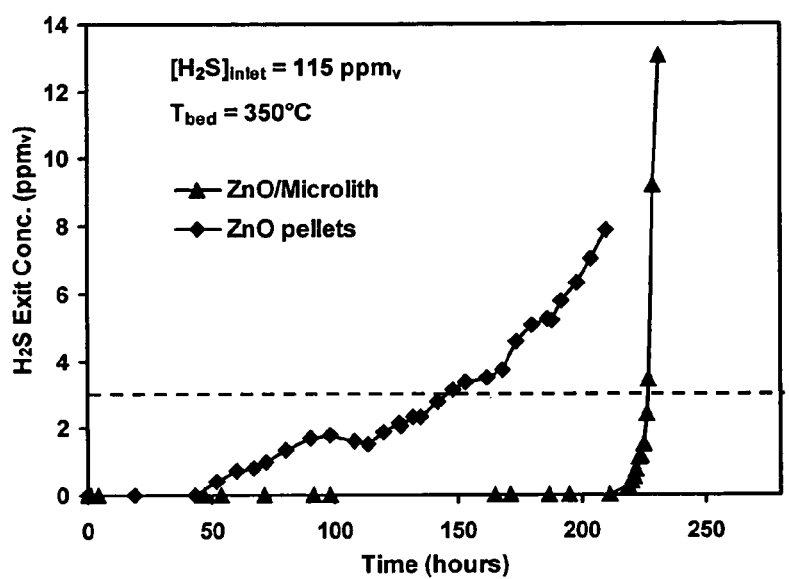
FIG. 1 provides a graphical representation of $H_2S$ exit concentration as a function of time obtained from two $H_2S$ sorption tests on: (i) the ZnO-coated Microlith® bed and (ii) the ZnO pellets bed.

The present invention provides a substrate with an improved sulfur sorption capacity which increases the lifetime of a sulfur removal unit in a fuel processor. Additionally, the present invention provides a regenerable, energy efficient, and lightweight sorption system for a more efficient removal of sulfur compounds in fuel cell applications. This technology employs a sorption bed comprising ultra-short-channel-length metal meshes coated with sulfur sorbents. The metal meshes further define a means for direct, resistive electrical-heating thereby providing the potential for short regeneration times, reduced power requirement, and net energy savings in comparison to the conventional packed-bed system.

Precision Combustion, Inc. (PCI), located in North Haven, Conn., has developed a formulation and an application method for coating zinc oxide (ZnO)-based powders on ultra-short-channel-length metal mesh elements, known as Microlith® and commercially available from PCI. Previous research at PCI has demonstrated that sorbent materials, such as zeolites and molecular sieves coated on Microlith® metal mesh elements could effectively adsorb/absorb a number of the contaminants of interest. The inert Microlith® substrates and the use of a binder during coating of the sorbent materials on them result in volumetric sorbent loadings that are typically lower than the packed bed system. The Microlith®-based sorption technology, however, provides the ability to directly resistively heat the metal mesh support, and thus offers the potential for relatively rapid periodic regenerations. The Microlith® can also pack more active surface area into a small volume, thereby increasing the sorption area for a given pressure drop.

Microlith® ultra-short-channel-length metal mesh technology is a novel reactor engineering design concept comprising of a series of ultra-short-channel-length, low thermal mass metal monoliths that replaces the long channels of a conventional monolith. Microlith® ultra-short-channel-length metal mesh design promotes the packing of more active area into a small volume, providing increased sorption area for a given pressure drop. The advantages of employing Microlith® ultra-short-channel-length metal mesh as a substrate include the feature of electrically heating the substrate to promote a reaction on a fluid flowing therethrough are described in U.S. Pat. No. 6,328,936 to Roychoudhury, et al., and is incorporated in its entirety herein.

Whereas in a conventional honeycomb monolith, a fully developed boundary layer is present over a considerable length of the device, the ultra short channel length characteristic of the Microlith® substrate avoids boundary layer buildup. Since heat and mass transfer coefficients depend on the boundary layer thickness, avoiding boundary layer buildup enhances transport properties. The advantage of employing Microlith® ultra-short-channel-length metal mesh as a substrate to control and limit the development of a boundary layer of a fluid passing therethrough is described in U.S. patent application Ser. No. 10/832,055, now granted as U.S. Pat. No. 7,504,047, which is a Continuation-in-Part of U.S. Pat. No. 6,746,657 to Castaldi, both incorporated in their entirety herein.

During the development of sulfur sorbent coating on Microlith® metal meshes, several formulations were evaluated in an effort to produce an adherent coating. The formulation should be easily applied, and the resulting coating should have a high degree of adhesion and be sufficiently abrasion resistant to withstand routine handling and multiple thermal cycles. The ZnO-based loading on Microlith® was found to be ~35-42 mg/in$^2$, which corresponds to a volumetric loading of ~7000-8400 mg/in$^3$.

Sulfur sorption tests were performed on the ZnO-coated Microlith® substrate using a model gas mixture consisting of hydrogen sulfide ($H_2S$) in order to evaluate the sulfur ($H_2S$) sorption capacity of the substrate. The sorption process by which ZnO removes the sulfur is absorption. The testing employed a linear stack of coated Microlith® screens (circular screens with an effective diameter of 0.80 inch), which was inserted into a 1 inch diameter stainless steel tube.

FIG. 1 shows the $H_2S$ outlet concentration as a function of time obtained from the $H_2S$ sorption tests on: (i) ZnO coated on Microlith® substrate and (ii) ZnO pellets bed under the same operating conditions set forth in Table 1 below. In these tests, a surrogate gas mixture containing 115 parts per million volume ("ppmv") $H_2S$ was flowed into each of the ZnO beds. The temperature of the beds was maintained at 350° C. throughout the tests. The surrogate gas was a blend of 23.4 mole % $H_2$, 16.4 mole % CO, 19.9 mole % $H_2O$, and 40.3 mole % $N_2$, which simulates the composition of PCI's typical autothermal reforming reactor (ATR) outlet stream when operating with >500 parts per million weight ("ppmw") sulfur JP-8.

For the ZnO pellets testing, the ZnO bed contained ~⅛ inch long, commercially available ZnO pellets, packed in a stainless steel tube 1 inch in diameter and 1.01 inch long. In all these tests, the gas hourly space velocity ("GHSV") was maintained at ~4050 h$^{-1}$ and the concentrations of $H_2S$ at the inlet and outlet ZnO bed streams were measured using a gas chromatography ("GC") equipped with a flame photometric detector ("FPD") and were checked periodically using Drager tubes.

Table 1 summarizes the test conditions and the resulting $H_2S$ sorption capacities for $H_2S$ sorption tests on two ZnO/Microlith® beds and one ZnO pellet bed. To date, we have performed multiple tests on several ZnO/Microlith® beds in order to confirm the high sulfur sorption capacity and the high bed utilization obtained during the $H_2S$ removal process from a surrogate gas mixture. The two different ZnO/Microlith® beds presented in Table 1 consisted of ZnO-coated Microlith® screens with different ZnO sorbent loading. The first bed, "Bed A", had a sorbent loading of ~35 mg/in² while the second bed, "Bed B", had an improved loading of 42 mg/in². These loadings corresponded to volumetric sorbent loadings of 7000 mg/in³ and 8400 mg/in³ for "Bed A" and "Bed B", respectively. Clearly, these loadings far exceed the prior art loading of approximately 1,000 mg/in³.

In "Bed A", the $H_2S$ breakthrough occurred after ~227 hours of continuous exposure to the surrogate gas mixture consisting of 115 ppmv $H_2S$ as shown in FIG. 1. Since "Bed B" had about 20% higher volumetric sorbent loading than "Bed A", the breakthrough time can be increased from 227 hours to 270 hours. Here, the breakthrough time was defined as the time when the $H_2S$ outlet concentration reached 3 ppmv; and such breakthrough level is indicated by a dashed line in FIG. 1. The results from our study showed that despite the difference in the ZnO sorbent loading on the Microlith® substrates, both ZnO/Microlith® beds gave a $H_2S$ sorption capacity of 33-34 wt. % based on the ZnO coating (i.e., 0.33-0.34 gram of $H_2S$ uptake per gram of ZnO coating) as shown in Table 1.

Table 1 provides detailed test conditions, ZnO loading, and the resulting $H_2S$ sorption capacities for $H_2S$ sorption tests on: (i) ZnO-coated Microlith® beds ("Bed A" and "Bed B") with different ZnO sorbent loading and (ii) ZnO pellets bed.

ZnO capacity is ~42 wt. % for a ZnO powder bed (i.e., 0.42 g of $H_2S$ uptake per gram of ZnO) and ~34 wt. % for a ZnO bed consisting of a formulation with 20 wt. % binder. The high wt. % sorption capacity observed in the ZnO/Microlith® beds may be due to the presence of well-dispersed ZnO particles on the surface of Microlith® substrates, and thus increases the amount of ZnO active surfaces that are accessible for the reaction with $H_2S$. Additionally, these ZnO/Microlith® beds gave a low pressure drop (i.e., <1 psi) across the 1.15 inch-long bed during the sulfur sorption tests.

As discussed above, in the Microlith®-based sorption system, the inert Microlith® substrates and the use of a binder during coating of the sorbent materials on them result in volumetric sorbent loadings that are typically lower than the packed bed system. In this particular study, the volumetric sorbent loading on the ZnO/Microlith® beds was 7000-8400 mg/in³, whereas the loading on the ZnO pellets bed was ~22,000 mg/in³. Therefore, the sorbent loading on the ZnO/Microlith® beds was about 32-38% of the loading found in a typical ZnO pellets bed. Due to the five-fold higher sorption capacity (weight basis), however, the ZnO/Microlith® beds gave a higher overall volumetric sorption capacity, and thus a longer bed lifetime, compared to the ZnO pellets bed. As shown in Table 1, the ZnO/Microlith® beds gave an overall volumetric sorption capacity of 0.145-0.171 g of $H_2S$ uptake/cm³ of sorber unit. This is about 1.5-1.8 higher capacity (volumetric basis) than that observed during testing with the ZnO pellets bed at the same operating conditions.

TABLE 1

|  | ZnO/Microlith ® ("Bed A") | ZnO/Microlith ® ("Bed B") | ZnO pellets |
|---|---|---|---|
| Gas composition (mole %) | 23.4% $H_2$, 16.4% CO, 40.3% $N_2$, 19.9% $H_2O$ | 23.4% $H_2$, 16.4% CO, 40.3% $N_2$, 19.9% $H_2O$ | 23.4% $H_2$, 16.4% CO, 40.3% $N_2$, 19.9% $H_2O$ |
| Total gas flow rate | 0.633 slpm | 0.633 slpm | 0.880 slpm |
| $V_{eff}$ or $V_{bed}$ | $V_{eff}$ = 0.57 in³ = 9.4 cm³ $V_{bed}$ = 0.90 in³ = 14.7 cm³ | $V_{eff}$ = 0.57 in³ = 9.4 cm³ $V_{bed}$ = 0.90 in³ = 14.7 cm³ | $V_{bed}$ = 0.78 in³ = 13.0 cm³ |
| Bed Temperature | 350° C. | 350° C. | 350° C. |
| ZnO (coating) weight | 4.011 g | 4.813 g | 17.974 g |
| Inlet $H_2S$ concentration | 115 ppm$_v$ | 115 ppm$_v$ | 115 ppm$_v$ |
| $H_2S$ uptake | 1.36 g | 1.61 g | 1.25 g |
| Breakthrough time | 227 hours | 270 hours | 146 hours |
| Wt. % $H_2S$ sorption (3 ppm$_v$ breakthrough) | 34.0 wt. % (based on ZnO coating) | 33.5 wt. % (based on ZnO coating) | 6.95 wt. % (based on ZnO pellets) |
| Vol. sorption capacity (g $H_2S$/V) | 0.145 g/cm³ ($V_{eff}$) | 0.171 g/cm³ ($V_{eff}$) | 0.096 g/cm³ ($V_{bed}$) |

Typically, the $H_2S$ sorption capacity of commercially available ZnO pellets or extrudates is in the range of 10-15 wt. %, depending on the operating atmosphere and conditions. The significant presence of water vapor (such as 20 mole % of water vapor in our tests) will reduce the $H_2S$ sorption capacity of the ZnO bed due to the co-adsorption of water molecules on the ZnO surface. The $H_2S$ sorption test on the ZnO pellet bed using the same operating conditions as in the tests on the ZnO/Microlith® beds set forth in Table 1 indicated a breakthrough after only 146 hours of continuous exposure to 115 ppmv $H_2S$, which is much lower than the breakthrough time observed with the ZnO/Microlith® beds. The test showed a $H_2S$ sorption capacity of only 6.95 wt. % based on the ZnO pellets (i.e., 0.0695 gram of $H_2S$ uptake per gram of ZnO pellets). This is almost five-fold lower capacity (weight basis) than the ZnO/Microlith® capacity observed at the same operating conditions.

Figure 2:
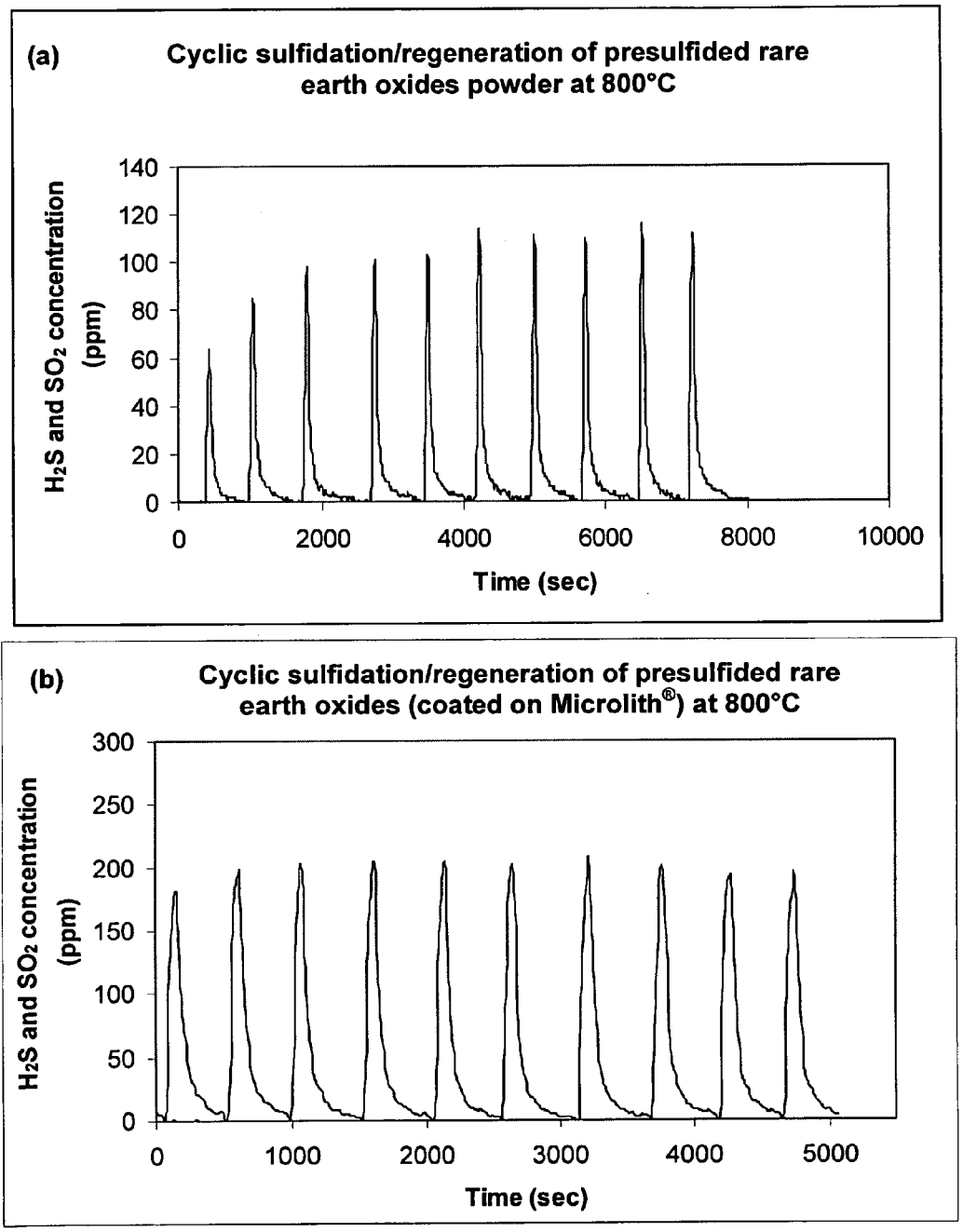
FIG. 2 provides a graphical representation of $H_2S$ and $SO_2$ concentrations as a function of time obtained from the 10-cycle sulfidation/regeneration test on: (a) presulfided rare earth oxides powder and (b) presulfided rare earth oxides coated on Microlith®.

The results from the sulfur sorption tests showed that the ZnO-coated Microlith® metal meshes were able to reach nearly full ZnO capacity, at ~33-34 wt. % based on the ZnO coating, with high bed utilization. In theory, the maximum In addition to the higher overall volumetric sorption capacity, the Microlith®-based sorption system has the unique ability to directly resistively heat the Microlith® metal meshes, which allows for rapid periodic regenerations via a direct internal heating. This can potentially reduce the weight and volume of the $H_2S$ removal beds in the integrated fuel processor. In order to show the potential for rapid regenerations, PCI has coated a high-temperature sulfur sorbent, developed by others (ref: M. Flytzani-Stephanopoulos, M. Sakbodin, and Z. Wang, *Science*, volume 312, 1508 (2006)), on Microlith® substrates with a sorbent loading of about 2,000 mg/in³. FIG. 2 shows the $H_2S$ and $SO_2$ concentrations observed during the 10-cycle sulfidation/regeneration test on both the rare earth oxides powder bed and the rare earth oxides coated on Microlith® bed. The testing showed that Microlith®-supported sorbent gave a similar sulfur sorption capacity to powder at the same space velocity, set forth in Table 2, which is the upper limit of achievable capacity, as well as provided a faster regeneration, set forth in Table 3.

Table 2 provides the sulfur sorption capacity (mg of S uptake per gram of sorbent) of (i) presulfided rare earth oxides powder and (ii) presulfided rare earth oxides coated on Microlith® substrates during the cyclic test at an $H_2S$ breakthrough level of 2 ppmv. The temperature was maintained at 800° C.

TABLE 2

| No Cycle | Powder (mg S/g) | On Microlith ® (mg S/g) |
|---|---|---|
| 1 | 1.3 | 1.5 |
| 2 | 1.3 | 1.3 |
| 3 | 1.0 | 1.1 |
| 4 | 1.0 | 1.1 |
| 5 | 1.0 | 1.3 |
| 6 | 1.0 | 1.3 |
| 7 | 1.0 | 1.1 |
| 8 | 1.3 | 1.3 |
| 9 | 1.3 | 1.3 |
| 10 | 1.3 | 1.1 |

Table 3 provides the regeneration time of (i) presulfided rare earth oxides powder and (ii) presulfided rare earth oxides coated on Microlith® substrates during the 10-cycle sulfidation/regeneration test. The temperature was maintained at 800° C.

TABLE 3

| No Cycle | Powder (sec) | On Microlith ® (sec) |
|---|---|---|
| 1 | 460 | 350 |
| 2 | 540 | 330 |
| 3 | 710 | 410 |
| 4 | 640 | 350 |
| 5 | 640 | 390 |
| 6 | 680 | 440 |
| 7 | 610 | 400 |
| 8 | 700 | 350 |
| 9 | 570 | 350 |
| 10 | 590 | 380 |

Although the invention has been described in considerable detail with respect to the advantages of sulfur sorbent materials supported on Microlith® metal meshes, it will be apparent that the invention is capable of numerous modifications and variations, apparent to those skilled in the art, without departing from the spirit and scope of the invention. For example, the sulfur sorbent materials supported on Microlith® metal meshes can be applied to sulfur sorption systems in various applications, such as gas clean up in coal gasification, fuel cell power plant with sulfur containing fuels, sulfur guard bed for sulfur sensitive catalysts in fuel processor and fuel cell technology, etc. Developing a more efficient, higher sorption capacity sulfur sorbent unit is important for providing a sulfur removal system with a longer lifetime. Additionally, the ability to directly resistively heat the metal substrate offers the potential for a rapid periodic regeneration, which will result in a compact, energy efficient, and lightweight sulfur sorption system.

The invention claimed is:

1. A method for regenerable sulfur sorption comprising:
    a) providing a substrate defining one layer of ultra short channel length mesh or a stack of layers of ultra short channel length meshes;
    b) coating at least a portion of the substrate with a formulation comprising a sulfur sorbent exhibiting a high degree of adhesion and abrasion resistance, such that the volumetric loading of the sulfur sorbent is greater than about 5,000 $mg/in^3$; and
    c) passing a flowstream comprising a sulfur compound through the substrate and in contact with the formulation.

2. The method of claim 1 wherein the sulfur sorbent comprises zinc oxide.

3. The method of claim 1 wherein the volumetric loading of the sulfur sorbent is greater than about 7,000 $mg/in^3$.

4. The method of claim 2 wherein the volumetric loading of the sulfur sorbent is greater than about 7,000 $mg/in^3$.

5. The method of claim 1 wherein the sorbent comprises a non-zeolite.

6. The method of claim 5 wherein the volumetric loading of the sulfur sorbent is greater than about 7,000 $mg/in^3$.

7. The method of claim 1 whereby the coated substrate exhibits an overall volumetric sorption capacity of about 0.1 to about 0.2 grams of $H_2S$ uptake per $cm^3$.

8. The method of claim 4 whereby the substrate is capable of conducting an electrical current therethrough and further comprising resistively heating the substrate.

9. The method of claim 6 whereby the substrate is capable of conducting an electrical current therethrough and further comprising resistively heating the substrate.

10. The method of claim 7 whereby the substrate is capable of conducting an electrical current therethrough and further comprising resistively heating the substrate.

11. The method of claim 1 wherein the sorption comprises absorption.

12. The method of claim 2 wherein the sorption comprises absorption.

13. The method of claim 5 wherein the sorption comprises absorption.

14. The method of claim 6 wherein the sorption comprises absorption.

15. The method of claim 7 wherein the sorption comprises absorption.

16. The method of claim 8 wherein the sorption comprises absorption.

17. The method of claim 9 wherein the sorption comprises absorption.

18. The method of claim 10 wherein the sorption comprises absorption.

19. The regenerative sorption method of claim 1, wherein the sulfur sorbent comprises zinc oxide; and the volumetric sorption capacity ranges from 0.1 to 0.2 grams of $H_2S$ uptake per $cm^3$ of substrate.

20. The method of claim 19 wherein the volumetric loading of zinc oxide is greater than 7,000 $mg/in^3$.

* * * * *